March 28, 1944.                A. PECHUKAS                    2,345,214
                        PURIFICATION OF LIQUID HALIDES
                            Filed April 1, 1942
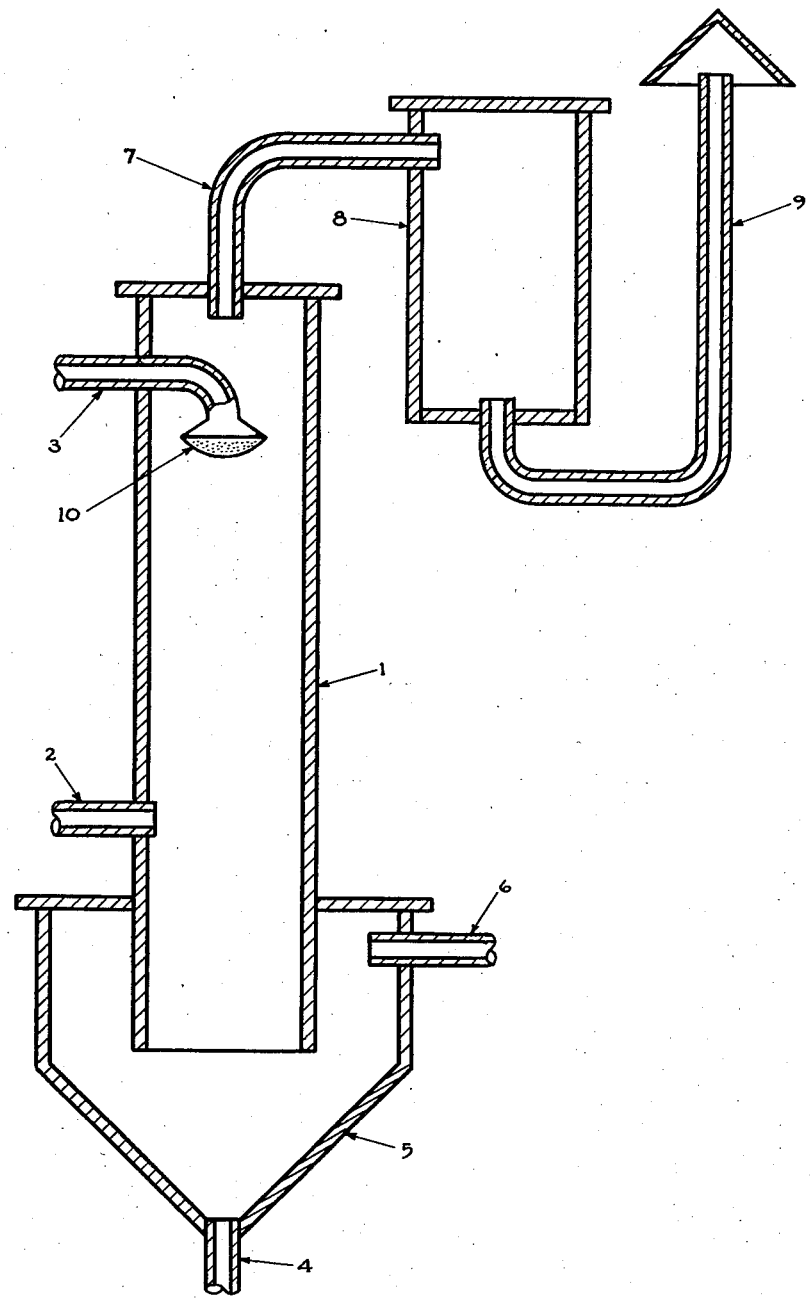
INVENTOR.
ALPHONSE PECHUKAS
BY Patented Mar. 28, 1944

2,345,214

UNITED STATES PATENT OFFICE 2,345,214

PURIFICATION OF LIQUID HALIDES

Alphonse Pechukas, Akron, Ohio, assignor to Pittsburgh Plate Glass Company, Pittsburgh, Pa., a corporation of Pennsylvania Application April 1, 1942, Serial No. 437,187

8 Claims. (Cl. 23—98)

This invention relates to a method of purifying a stable normally liquid distillable tetrahalide of the fourth group of elements and/or to the removal of color bodies therefrom. The production of these halides often results in their recovery in an impure form. For example, titanium tetrachloride prepared by chlorination of ilmenite or similar ore often contains vanadium, iron, molybdenum, and possibly other unidentified impurities. Stannic chloride prepared by chlorination of tin ores or tin alloys often contains arsenic or antimony and may contain vanadium. Silicon tetrachloride or germanium tetrachloride may be similarly contaminated. These impurities are generally present in very small concentrations usually being about 0.01 to 0.1 percent by weight of the tetrachloride and are rarely present in concentrations above 5 per cent by weight of the tetrachloride.

In accordance with the present invention, I have found that a large portion of these impurities may be removed by treating the tetrachloride with a reactive sulphide such as hydrogen sulphide. Other reactive sulphides or hydrosulphides such as organic mercaptans, for example, methyl or ethyl mercaptans, reactive inorganic sulphides, such as arsenious or cuprous sulphide, antimony trisulphide, etc., may be used.

Upon treatment of chlorides such as titanium tetrachloride, stannic chloride, or other chloride with a reactive sulphide such as hydrogen sulphide, a precipitate generally is formed which contains a portion of the impurities. For example, a large portion of the vanadium and iron present in titanium tetrachloride is removed in this manner. Materials such as compounds of arsenic, vanadium, or antimony which are often present in stannic chloride may be precipitated to a substantial degree by this process. In some cases a small quantity of a compound of titanium, tin, or like metal may be precipitated during treatment, but in general, treatment is discontinued before more than two or three percent of the titanium, germanium, or silicon is precipitated.

If desired, the process may be conducted by treating with hydrogen sulphide complexes such as the addition compounds formed by reaction of H$_2$S with titanium tetrachloride or other titanium halide or stannic chloride or other liquid chloride above mentioned. These materials may be prepared, for example, by introduction of H$_2$S under pressure into a portion of the liquid halide. The mixture thus obtained may be added to the impure liquid halide to be treated.

It has been found that the sulphides such as hydrogen sulphide not only remove precipitable impurities but also reduce to a lower valent state certain unprecipitated impurities such as vanadium which are present in the liquid, whereby a more effective separation of such materials may be secured upon subsequent distillation of the liquid tetrachloride. This insures a more complete removal of the impurities in the liquid tetrachloride.

The precipitate, if formed, may be removed from the liquid tetrachloride by decantation and/or filtration or the liquid may be distilled from the precipitate. Prior to distillation, the liquid may be discolored due, in all probability, to the conversion of certain of the impurities which are not precipitated to a different form. Upon distillation of such colored products, however, a liquid halide of improved color is secured. Further, it is found that since many of the unprecipitated impurities are converted into products possessing high boiling points and no longer distill with the titanium, tin, silicon, or germanium tetrachloride, a product of higher purity is secured by such distillation.

The treatment is conducted generally at or near room temperature, although higher or lower temperatures are permissible. Vaporized titanium, tin, or silicon tetrachloride may be contacted with hydrogen sulphide for the purpose of purifying the tetrachloride although undesirably large amounts of the corresponding sulphides may be formed in such process unless the proportions of hydrogen sulphide to the tetrachloride is kept low. The treatment may be conducted under pressure, if desired.

The process is generally conducted in the substantial absence of chlorine, hydrogen chloride, or water vapor, in order to avoid additional reactions which tend to complicate the problem. Thus, it will be apparent that the liquid undergoing treatment should be substantially anhydrous.

In treating these liquid halides with H$_2$S, difficulty may be encountered in securing initiation of the precipitation of impurities. Thus, it is occasionally observed that when hydrogen sulphide is bubbled through a pool of liquid tin, titanium, or other liquid tetrachloride, little or no precipitate is formed. In such a case, while the tetrachloride after distillation is found to be of somewhat increased purity, the liquid often is insufficiently pure.

In accordance with the present invention, applicant has found that precipitation of impurities always occurs if the treatment is conducted by flowing a film of the liquid tetrachloride undergoing treatment over a solid surface while contacting the film with gaseous H₂S. The thickness of the film is capable of some variation, but in general, does not exceed 0.05 inch. This process may be effectively performed by permitting the liquid titanium tetrachloride, stannic chloride, etc., to percolate through a tower packed with a porous bed of discrete solid bodies of various sizes, generally at least about one-fourth inch in diameter, while permitting gaseous H₂S to flow through the tower.

The process will be more fully understood by reference to the accompanying drawing which is a diagrammatic sectional view of a suitable apparatus for performing the process. The apparatus comprises a tower 1, provided with a receptacle 5, for collecting the treated tetrachloride. The tower is packed with a porous bed of inert solid particles such as carbon rings, glass beads, silica chips, etc., which provide a surface upon which the tin, titanium, silicon or germanium tetrachloride may flow. This bed should be sufficiently porous to permit ready flow of gas and liquid therethrough. In the operation of the process a stream of the liquid tetrachloride is introduced through inlet 3 and is allowed to flow downwardly through the bed and is collected at the base of the tower in reservoir 5. Preferably, the level of the liquid tetrachloride is maintained such that the bed or a major portion thereof of carbon rings or similar material remains above the liquid level and is not immersed in the liquid. Thus, the gaseous phase in the treating tower is substantially continuous. Hydrogen sulphide is introduced at the base of the column at 2, and is permitted to flow upwardly through the tower in contact with the tetrachloride and finally escapes through the outlet 7, where it may be vented into a suitable exhaust system including a chamber 8, in which occluded tetrachloride may settle out provided with a conduit 9, for exhausting the H₂S.

Treated tetrachloride containing precipitated impurities is collected at the reservoir and permitted to settle. A portion of the treated tetrachloride and the settled precipitate is withdrawn from outlet 4. The remaining tetrachloride substantially free from precipitate is withdrawn through outlet 6, and after heating to remove dissolved H₂S is distilled to produce a water-white product.

In accordance with a further modification, the process may also be conducted by concurrent treatment of the tetrachloride with H₂S. This may be done by use of the apparatus previously discussed. In such a case, the process is conducted as previously described with the exception that the direction of flow of H₂S is reversed by introducing this agent through the pipe 7, and withdrawing unabsorbed H₂S through pipe 6.

The following examples are illustrative:

Example I

A stream of gaseous hydrogen sulphide was introduced into a quantity of yellow titanium tetrachloride containing 0.25 percent of vanadium and 0.0002 percent of iron at a temperature of 25° C. and a brownish black precipitate was formed. Upon removal of the precipitate the liquid titanium tetrachloride was dark red. The red liquor was distilled and practically pure water-white titanium tetrachloride which was free of vanadium and iron was secured.

Example II 2.5 parts by weight of arsenious sulphide was mixed with 180 parts by weight of yellow titanium tetrachloride which contained a small amount of vanadium. The mixture was then distilled and water-white titanium tetrachloride was obtained.

Example III

A column 4 inches in diameter was packed with carbon rings ½ inch in diameter to form a porous bed 5 feet deep. Yellow liquid titanium tetrachloride containing 0.08 percent vanadium was allowed to trickle over the bed at a rate of 7 gallons per hour and dry gaseous hydrogen sulphide was introduced into the base of the bed at a rate of 10 cubic feet per hour. Treated titanium tetrachloride was collected at the base of the bed. Upon distillation of the treated liquid water-white anhydrous titanium tetrachloride was secured.

Example IV

A column 2 inches in diameter was packed with carbon rings ¼ inch in diameter to form a porous bed 3 feet deep. Liquid tin tetrachloride containing 0.95 percent arsenic was allowed to trickle over the bed at a rate of one liter per hour and dry gaseous hydrogen sulphide was introduced into the base of the bed at a rate of 1.5 liters per minute. Treated tin tetrachloride was collected at the base of the bed. Upon distillation of the treated liquid water-white anhydrous tin tetrachloride was secured, containing less than 0.001 percent arsenic.

While the invention is particularly directed to the removal of color from the liquid tetrachlorides above mentioned, it may be applied to the removal of color from other tetrahalides such as titanium tetrafluoride or titanium tetrabromide, or other metallic liquid halides such as stannic chloride, arsenic trichloride, and germanium tetrachloride, or the corresponding liquid bromides, fluorides, or iodides of silicon, tin, or germanium.

Although the present invention has been described with reference to the specific details of certain embodiments thereof, it is not intended that such details shall be regarded as limitations upon the scope of the invention, except insofar as included in the accompanying claims.

This application is a continuation-in-part of application Serial No. 308,008, filed December 7, 1939, now issued as U. S. Patent 2,289,327.

I claim:

1. A method of purifying a substantially anhydrous stannic halide containing a metallic impurity which comprises precipitating impurities therefore by means of a reactive sulphide.

2. A method of removing color from impure colored substantially anhydrous stannic chloride which comprises precipitating impurities therefrom by means of hydrogen sulphide and distilling the stannic chloride.

3. The process of claim 1 wherein the sulphide is a reaction product of stannic halide and hydrogen sulphide.

4. A method of purifying substantially anhydrous stannic chloride which comprises contacting the same with a reactive sulphide and distilling the treated chloride.

5. A method of purifying a substantially anhydrous normally liquid distillable halide of a metal of the fourth group of elements which comprises precipitating impurities therefrom by means of a reactive sulphide.

6. The process of claim 5 in which the sulphide is hydrogen sulphide.

7. A method of purifying a substantially anhydrous stannic chloride containing a metallic impurity which comprises forming a porous bed of solid discrete inert elements, permitting a stream of said chloride in liquid state to percolate through the bed and introducing H₂S into the bed to cause precipitation of an impurity from the chloride.

8. A method of purifying a substantially anhydrous normally liquid distillable halide of a metal of the fourth group of elements containing a metallic impurity which comprises forming a porous bed of solid discrete inert elements, permitting a stream of said halide in liquid state to percolate through the bed and introducing H₂S into the bed to cause precipitation of an impurity from the halide.

ALPHONSE PECHUKAS